Aug. 2, 1966  H. SANDER  3,264,539
DIRECT CURRENT MOTOR WITH TRANSISTORIZED POWER SUPPLY
Filed Sept. 10, 1964  2 Sheets-Sheet 1
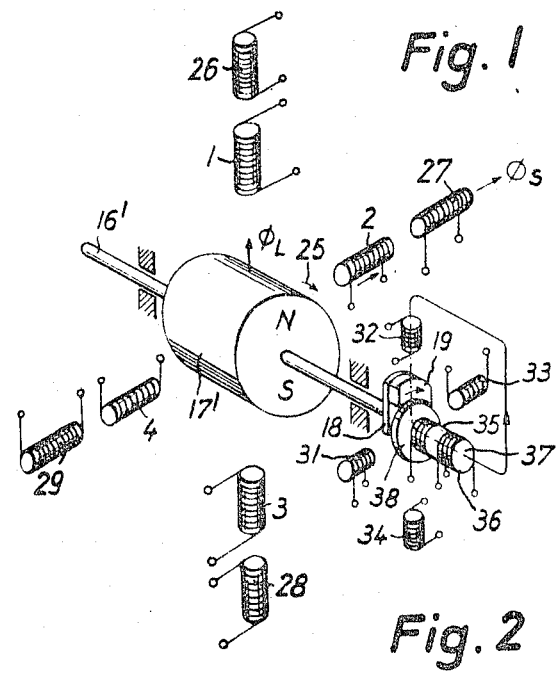
Fig. 1
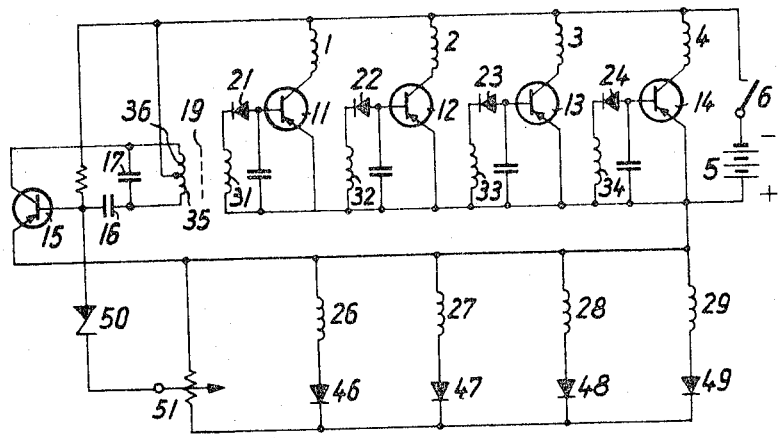
Fig. 2
Fig. 3
Inventor:
HORST SANDER
BY Spencer & Kaye
ATTORNEYS

United States Patent Office 3,264,539
Patented August 2, 1966

3,264,539
DIRECT CURRENT MOTOR WITH TRANSISTOR-IZED POWER SUPPLY
Horst Sander, Berlin-Spandau, Germany, assignor to Licentia Patent-Verwaltungs-G.m.b.H., Frankfurt am Main, Germany
Filed Sept. 10, 1964, Ser. No. 395,533
Claims priority, application Germany, Feb. 27, 1964,
L 47,149
5 Claims. (Cl. 318—138)

The present invention relates to a direct current (D.C.) motor whose armature windings are connected to a transistorized power supply.

A motor control arrangement of this type is shown in copending application Serial No. 380,266, filed July 6, 1964, by Julian Hartmann and Helmut Moczala, for "Direct Current Motor with Transistorized Power Supply," wherein the rotational speed of a D.C. motor is regulated in that the transistors feeding the armature windings are controlled by a control circuit as a function of the instantaneous angular position of the rotor relative to the stator. The control circuit is constituted by a feedback circuit which consists of control windings and of a control transistor, this control circuit inducing the control windings which in turn control the armature transistors. According to the arrangement shown in the mentioned application, a so-called tachometer voltage, i.e., a voltage which is a function of the rotational speed of the motor, is generated, which tachometer voltage is applied to the control circuit of the motor. When a predetermined, so-called nominal speed, is reached, the tachometer voltage renders the control circuit ineffective, thereby to interrupt the flow of current through the armature. The magnetic inductor for the tachometer voltage is constituted by the magnetic cylindrical rotor of the motor. The windings in which the tachometer voltage is induced lie in the same slots as the actual operating windings of the motor.

In the drawings:

FIGURES 1 to 3, inclusive, relate to the arrangement shown in the mentioned prior application.

Figure 4:
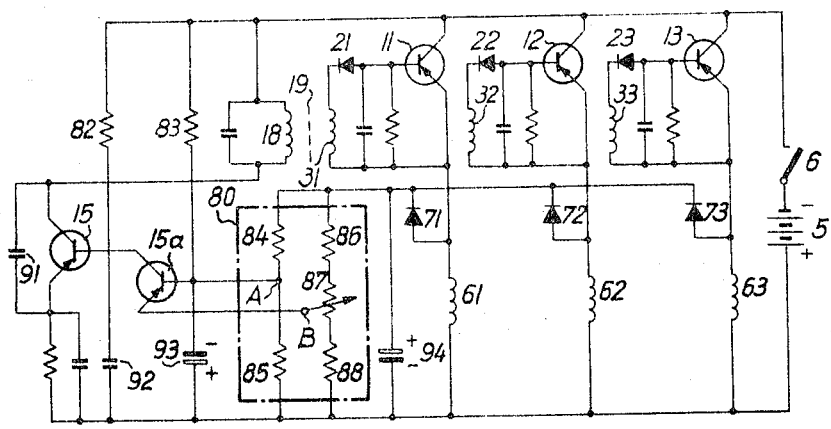
FIGURE 4 is a circuit diagram of a preferred embodiment of a motor control arrangement according to the present invention.

For a better understanding of the above-described arrangement disclosed in the prior application, which is believed essential in order to obtain a fuller appreciation of the present invention, to be described in detail below, reference is made to FIGURES 1 to 3 of the accompanying drawings, in which FIGURE 1 is a perspective diagrammatic representation of a motor according to the prior application and shows certain ones of the electromechanical components, FIGURE 2 is a circuit diagram of one embodiment of the motor control arrangement according to the prior application, and FIGURE 3 is a graph of the timed relationship of a voltage effective in the motor control circuit of FIGURES 1 and 2.

FIGURES 1 and 2 show a rotor 17' mounted on a shaft 16', this rotor being, for the sake of simplicity, represented as a rotating, cylindrical magnet whose polarity is shown at N and S. The stationary armature windings, being the operating windings, are indicated at 1, 2, 3, 4. These windings are connected to transistors 11, 12, 13, 14 (FIGURE 2) which, in accordance with the particular angular position of the magnetic rotor, cause D.C. pulses to flow through the windings, in cyclical sequence, such that the magnet rotor is, as in a rotating field, continuously subjected to an electromagnetic pull or torque, thereby to start the motor and to maintain the rotor in rotation so long as a battery 5 is switched in by closing of a switch 6.

The cyclic sequence of the electronic control of the armature transistors, which function as controlled switching transistors, is brought about by the motor itself. Mounted on the shaft 16' for rotation therewith is a carrier 18 carrying a block 19, made of high-frequency iron or ferrite and having the shape of an arcuate segment. The purpose of this segment 19 is to conduct the magnetic flux of a high-frequency oscillator (this being the feedback), consisting of the windings 35 and 36 which are wound on a core 37, 38, the control transistor 15, and the capacitors 16 and 17, cyclically from core 38 to the cores of the control windings 31, 32, 33, 34. The high-frequency voltages induced in these control windings 31, 32, 33, 34, are rectified by means of respective diodes 21, 22, 23, 24, and are applied, as control voltages, to the bases of the armature transistors 11, 12, 13, 14. The emitter-collector path of each transistor thus remains conductive as long as a control voltage is applied to it, i.e., so long as there is a magnetic flux passing through the respective control coil. The oscillator itself, of course, remains excited so long as the battery 5 is connected to the circuit by means of the switch 6.

The transistor fed D.C. motor could, theoretically, continuously increase its rotational speed until its counter electromotive force is induced in the armature windings, if no provision were made for maintaining a given predetermined rotational speed. According to the disclosure in the prior application, the rotational speed is limited by turning off the oscillator and hence the high-frequency control, this being done by applying to the base of the oscillator transistor the above-mentioned tachometer voltage which is proportional to the increasing rotational speed. Consequently, when there is no longer any regulation, the armature windings 1, 2, 3, 4, will no longer be fed with any current pulses, as a result of which the motor reduces its speed. But as the rotational speed drops, the tachometer voltage, i.e., the voltage which is proportional to the rotational speed of the motor, drops below the blocking voltage of the oscillator transistor, and this will, in a manner of speaking, again turn on the oscillator and the high-frequency control becomes effective once more. The motor therefore again has a driving pulse applied to it. This entire process is repeated, within narrow limits, of course, so that the motor will run at what is, for all practical purposes, a constant speed.

The basic components by means of which the rotational speed of the motor is regulated, together with their function, will be explained in conjunction with FIGURES 1 and 2. The cylindrical magnetic rotor 17' serves as the magnetic inductor of the tachometer generator which delivers the tachometer voltage, the same being induced in tachometer windings 26, 27, 28, 29, which lie in the same slots as do the working windings 1, 2, 3, 4. The tachometer windings are connected, via respective rectifier diodes 46, 47, 48, 49, and a control potentiometer 51 to the so-called tachometer circuit such that the rectified voltage taken off potentiometer 51 is applied via a Zener diode 50 to the emitter-base path of the oscillator transistor 15, whereat it acts as a blocking voltage. The Zener diode maintains this blocking voltage constant at a value which is precisely of such amplitude as to stop the oscillation.

The graph of FIGURE 3 shows the blocking voltage V which is limited by the Zener diode 50, this being a rectified sinusoidal voltage of a single exciter path of the tachometer generator. The rectifier tachometer generator voltage can, for example, be so reduced by the potentiometer that the motor again has to increase its speed until the tachometer generator voltage increases and reaches the blocking voltage, whereupon the motor will be driven at the new, increased rotational speed. If this voltage is increased by the potentiometer, the rotational speed of the motor is reduced. In this way, the nominal r.p.m., i.e., the predetermined rotational speed at which the motor is to run, may be adjusted, within a wide range, by the potentiometer 51.

It is the primary object of the present invention to provide a control arrangement of the above type which is an improvement of the arrangement disclosed in the prior application, particularly to provide an arrangement which includes a quick-acting control circuit, thereby to make it possible to obtain a more rapid and very accurate speed regulation. With this object in view, the present invention resides in a motor regulation circuit which differs from the circuit described above in that the tachometer voltage is applied to a bridge circuit to which the control transistor of the high-frequency oscillator is connected. In a preferred embodiment of the present invention, a second, so-called regulating transistor is interposed between the control transistor and the bridge circuit to which the tachometer voltage is applied.

In practice, the tachometer voltage may be derived not from separate tachometer windings but, as will be described below, from the armature windings themselves which thus serve the double purpose of producing the rotating field and also to produce the tachometer voltage.

Additional objects and advantages of the present invention will become apparent upon consideration of the following description when taken in conjunction with the accompanying drawings.

Referring once again to the drawings and now to FIGURE 4 thereof, in which the same reference numerals are used to represent components analogous to those described above, the stationary armature windings, i.e., the actual working windings 61, 62, 63, are controlled by the respective switching transistors 11, 12, 13, such that, so long as the battery 5 is connected in circuit by closing of the switch 6, D.C. pulses will be made to flow cyclically through the windings, depending on the instantaneous angular position of the rotor with respect to the stator, so as to subject the rotor to an electromagnetic torque, in the manner of a rotating electric field. As before, the segments 19 act to send the magnetic flux of the oscillator, which is fed back by capacitor 91, through the control windings 31, 32, 33. The high-frequency voltages induced in the control windings are rectified by diodes 21, 22, 23 and are applied, as control voltages, to the emitter-base paths of the armature transistors. Consequently, the emitter-collector path of each armature transistor remains conductive so long as a control voltage is applied, i.e., so long as there is a magnetic flux through the corresponding control winding, the oscillator remaining excited as long as the battery 5 is switched in.

If now the control voltage changes, for example, if the amplitude of the oscillations decreases, the armature transistors will no longer be fully conductive and the rotational speed of the motor will drop. As a result, the tachometer voltage will likewise drop, whereupon the oscillator is made to increase the amplitude of its oscillations, thereby increasing the conductivity of the armature transistors which, in turn, increases the torque and hence the rotational speed of the motor.

While in the arrangement shown in FIGURES 1 and 2, representing the invention disclosed in the prior application, the tachometer voltage is derived from the separate windings 26, 27, 28, 29, the tachometer voltage for speed-regulating the motor is, in the circuit of FIGURE 4, derived from the same armature windings which produce the rotary field that drives the motor, and FIGURE 4 shows how these armature windings, identified at 61, 62, 63, are arranged to produce this result.

Each of the armature windings 61, 62, 63, has one terminal connected to the positive terminal of the battery 5, the other terminal of each winding being connected to the negative terminal of the battery via the emitter-collector path of the corresponding switching transistors 11, 12, 13. Each winding is further connected to a respective rectifier diode 71, 72, 73, and the three series-circuits constituted by each armature winding with its respective rectifier diode are connected in parallel across a capacitor 94. The tachometer voltage thus obtained is applied to one diagonal of a bridge circuit 80, to be described below.

Figure 5:
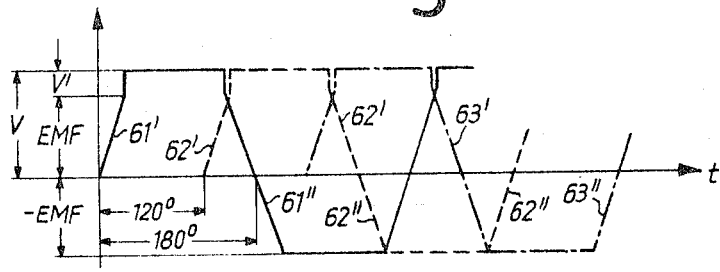
FIGURE 5 is a graph showing the timed relationship of the voltage effective in the motor control circuit of FIGURE 4.

In this way, the armature windings 61, 62, 63, serve their double purpose, namely, to produce the rotary field which drives the rotor and to yield the tachometer voltage. This is made possible by the fact that the armature windings, in contradistinction to armature windings of conventional D.C. motors provided with brushes, have a voltage connected across them by the respective switching transistors only throughout the working half-wave of the operating cycle, as shown in FIGURE 5 at 61', 62', 63', the amplitude of the working half-wave being derived from the electromotive force which is enlarged by V' and, in accordance with this amount, is equal to the voltage V of the battery 5. As a result, the armature windings are available during the other half of the operating cycle, which may be termed the measuring half-wave as opposed to the above-mentioned working half-wave; this is shown at 61", 62", 63", during which measuring half-wave the E.M.F. is measured, as depicted in FIGURE 5.

The three armature windings 61, 62, 63, forming part of the arrangement described above are, in practice, oriented radially with respect to the center of the rotor and are angularly displaced 120° relative to each other. The windings are so designed that the measuring half-waves 61", 62", 63", are trapezoidal and provide a constant measuring voltage which is used, in the manner described above, as the tachometer voltage for purposes of regulating the speed of the motor.

The circuit further comprises a resistor 82 over which the base of transistor 15 is connected to the negative terminal of the battery 5 when the switch 6 is closed. This initiates oscillation of the oscillator which is fed back by capacitor 91, so that the motor starts to run. As explained above, the oscillator remains turned on so long as the switch 6 remains closed, as a result of which the armature transistors 11, 12, 13, will continually receive pulses so that the motor r.p.m. continues to increase. The motor continues to accelerate until a counter electromotive force (E.M.F.) is induced in the armature windings, unless means are provided for regulating the speed of the motor to a lesser speed. This, in accordance with the present invention and in contradistinction to the arrangement shown in FIGURES 1 and 2, is effected by means of a bridge circuit and a second transistor serving as a regulating transistor, which is connected in the emitter-base circuit of the control transistor 15. The emitter-base circuit of the regulating transistor, shown at 15a, is connected across the other diagonal of the bridge circuit 80. This bridge circuit comprises two resistors 84, 85, lying in adjacent branches, the other two branches being constituted by the serially connected resistors 86, 87, 88. The resistor 86 is a voltage-dependent resistor, the other resistors 84, 85, 87, 88, being resistors whose resistances are independent of the voltage applied thereacross. As shown in FIGURE 4, the base of transistor 15a is connected to point A joining the resistors 84 and 85 while the emitter of transistor 15a is connected to point B which is the tape of the potentiometer-type resistor 87.

So long as the motor is in the process of accelerating up to its nominal speed, the point A is positive and point B is negative. The positive potential at point A, connected to the base of transistor 15a, blocks the transistor so that no current can flow through the base-emitter path. Consequently, the regulating transistor 15a has, during this phase of the operation, no influence on the oscillator.

As soon as the motor reaches its nominal speed, the potential at points A and B is reversed, so that point A now has a negative potential and point B a positive potential. As a result, the base of the regulating transistor 15a is biased negatively, thereby rendering the base-emitter path conductive so that current may flow through the emitter-collector path of the regulating transistor 15a. The capacitor 92, which is connected across the base of control transistor 15 and the positive terminal of the battery 5, is now short-circuited due to the fact that the regulating transistor 15a has been rendered conductive. Consequently, a positive potential is applied to the base of the control transistor 15 and the oscillator is now damped. As a result, the armature transistors are no longer as conductive as before, thereby reducing the voltage induced in the armature windings. Consequently, the motor, after having been started, will exceed its nominal speed by but a negligible amount, whereafter it is made to rotate at a constant speed.

The speed regulation is improved by means of a further capacitor 93 connected across the base of the regulating transistors 15a and the positive terminal of the battery 5 and a resistor 83 connected across the base of transistor 15a and the negative terminal of the battery 5.

It will be seen from the above that, thanks to the bridge circuit used in the speed regulator according to the present invention, the motor will be made to reach its nominal speed and thereafter be made to run at a very constant speed.

It will be understood that the above description of the present invention is susceptible to various modifications, changes, and adaptations, and the same are intended to be comprehended within the meaning and range of equivalents of the appended claims.

What is claimed is:

1. In a D.C. motor having a stator and a rotor, the combination which comprises: means forming armature windings; a power supply having armature transistors connected to said windings; a control circuit connected to said armature transistors for controlling the same in dependence on the relative angular position between the stator and rotor, said control circuit being an oscillatory circuit incorporating a control transistor; and speed regulating means connected to said control circuit for applying thereto a tachometer voltage, dependent on the rotational speed of the motor, which renders said control circuit ineffective at a given predetermined rotational speed, said speed regulating means incorporating a bridge circuit to which said tachometer voltage is applied, said bridge circuit being connected to said control transistor.

2. The combination defined in claim 1 wherein said speed regulating means includes a regulating transistor interposed between said bridge circuit and said control transistor.

3. The combination defined in claim 2 wherein the tachometer voltage is applied across one diagonal of said bridge, wherein said regulating transistor is connected across the base-emitter path of said control transistor, and wherein the collector of said regulating transistor is connected to the base of said control transistor, and the base and emitter of said regulating transistor are connected across the other diagonal of said bridge circuit.

4. The combination defined in claim 3 wherein said bridge circuit has a plurality of arms each of which incorporates resistance means, the resistance means in one of said arms including a voltage-dependent resistor and the resistance means in the other of said arms being voltage-independent resistors.

5. The combination defined in claim 3 wherein the voltage applied to said base of said regulating transistor changes its polarity upon attainment of said predetermined rotational speed, thereby to change the state of conductivity of said regulating transistor and to obtain a precise speed regulation.

No references cited.

ORIS L. RADER, *Primary Examiner.*

G. SIMMONS, *Assistant Examiner.*